US012699565B2

(12) United States Patent
Grant

(10) Patent No.: US 12,699,565 B2
(45) Date of Patent: Aug. 4, 2026

(54) PROCESSOR EMPLOYING INSTRUCTION THAT PERFORMS A BITWISE MAJORITY VOTE OPERATION

(71) Applicant: Apogee Semiconductor, Inc., Plano, TX (US)

(72) Inventor: David A. Grant, Dallas, TX (US)

(73) Assignee: Apogee Semiconductor, Inc., Plano, TX (US)

( * ) Notice: Subject to any disclaimer, the term of this patent is extended or adjusted under 35 U.S.C. 154(b) by 0 days.

(21) Appl. No.: 18/759,810

(22) Filed: Jun. 29, 2024

(65) Prior Publication Data

US 2026/0003621 A1      Jan. 1, 2026

(51) Int. Cl.
*G06F 9/30* (2018.01)

(52) U.S. Cl.
CPC ........ *G06F 9/30134* (2013.01); *G06F 9/3001* (2013.01)

(58) Field of Classification Search
CPC .............. G06F 9/3001; G06F 9/30029; G06F 9/30036; G06F 9/30098; G06F 11/16; G06F 11/167; G06F 11/1629; G06F 11/1633; G06F 11/20; G06F 11/202; G06F 11/2094
See application file for complete search history.

(56) References Cited

U.S. PATENT DOCUMENTS

| | | | |
|---|---|---|---|
| 4,375,683 A | 3/1983 | Wensley | 371/36 |
| 4,799,140 A | 1/1989 | Dietz et al. | 364/140 |
| 5,680,408 A * | 10/1997 | Tsirkel | G06F 11/187 |
| | | | 712/42 |
| 5,903,717 A | 5/1999 | Wardrop | 395/182.1 |
| 5,923,830 A | 7/1999 | Fuchs et al. | 395/182.09 |
| 6,128,755 A | 10/2000 | Bello et al. | 714/715 |
| 6,910,173 B2 | 6/2005 | Mitra et al. | 714/760 |
| 7,036,059 B1 | 4/2006 | Carmichael et al. | 714/725 |
| 7,389,460 B1 | 6/2008 | Demara | 714/733 |
| 7,392,426 B2 | 6/2008 | Wolfe et al. | 714/11 |
| 8,214,625 B1 | 7/2012 | Nickolls et al. | 712/220 |
| 8,392,810 B2 | 3/2013 | Linsky et al. | 714/797 |
| 10,152,328 B2 | 12/2018 | Nickolls et al. | G06F 9/3851 |
| 11,586,497 B1 | 2/2023 | Geist et al. | G06F 11/106 |

(Continued)

OTHER PUBLICATIONS

Parallel Thread Execution ISA, NVIDIA Corporation, 302 pages (Jun. 2018, version v6.0).

*Primary Examiner* — Jacob Petranek
(74) *Attorney, Agent, or Firm* — Imperium Patent Works LLP; T. Lester Wallace

(57) ABSTRACT

A system includes a feedback control loop signal path. Circuitry of the signal path includes three processors. Each processor ("slice") includes an ADC, a digital signal processor (DSP), and a DAC. The DSPs of the three slices execute identical programs of instructions, and are clocked in unison so that at any given time they are executing the same instruction. The DSP of the slice executes an instruction that performs a "register bitwise majority vote" (RMAJ) operation. The instruction identifies a register of the slice, and the data content of this register is output via a bus to the two other slices. The DSP performs a bitwise majority vote on: 1) the data content of the register, 2) the data content of the corresponding register in each of the other two slices. The result of the bitwise majority vote is written into the register of the slice.

24 Claims, 6 Drawing Sheets

(56)     References Cited

U.S. PATENT DOCUMENTS

| | | | |
|---|---|---|---|
| 11,645,185 B2 | 5/2023 | Elbaum et al. | G06F 11/3409 |
| 11,726,943 B2 | 8/2023 | Hamlyn et al. | G06F 13/4072 |
| 11,784,250 B1 | 10/2023 | Hamlyn | H01L 29/7833 |
| 11,791,831 B1 | 10/2023 | Grant et al. | H03M 1/0687 |
| 11,848,673 B1 | 12/2023 | Grant et al. | H03K 19/23 |
| 11,966,284 B1 | 4/2024 | Lameres et al. | G06F 11/0793 |
| 2003/0061535 A1 | 3/2003 | Bickel | 714/11 |
| 2004/0199813 A1 | 10/2004 | Hillman et al. | 714/13 |
| 2005/0278567 A1* | 12/2005 | Wolfe | G06F 11/187 |
| | | | 714/E11.069 |
| 2006/0036909 A1 | 2/2006 | VanBuren | 714/15 |
| 2006/0150186 A1 | 7/2006 | Grayver | 718/102 |
| 2009/0292977 A1* | 11/2009 | Bradley | G06F 11/167 |
| | | | 711/E12.002 |
| 2010/0269022 A1* | 10/2010 | Clark | G06F 9/3867 |
| | | | 714/764 |
| 2014/0289494 A1 | 9/2014 | Ould-Ahmed-Vall et al. | |
| | | | G06F 9/30 |
| 2016/0321078 A1 | 11/2016 | Bailey | G06F 9/3802 |
| 2018/0076815 A1* | 3/2018 | Vigeant | G07C 13/02 |
| 2019/0042260 A1* | 2/2019 | Ould-Ahmed-Vall | |
| | | | G06F 17/16 |
| 2020/0034262 A1* | 1/2020 | Bemanian | G06F 11/2242 |
| 2020/0097040 A1 | 3/2020 | Mautner et al. | G06F 1/12 |
| 2021/0182383 A1* | 6/2021 | Dervin | G11C 29/16 |
| 2022/0391264 A1 | 12/2022 | Tirumala et al. | G06F 9/52 |
| 2023/0169248 A1 | 6/2023 | Miryala et al. | G06F 30/327 |
| 2024/0105721 A1 | 3/2024 | Donnelly et al. | H01L 27/092 |

* cited by examiner

RAD HARD SWITCH MODE  POWER SUPPLY CIRCUIT

RAD HARD POWER SUPPLY CIRCUIT

ONE SLICE

DIGITAL SIGNAL PROCESSOR

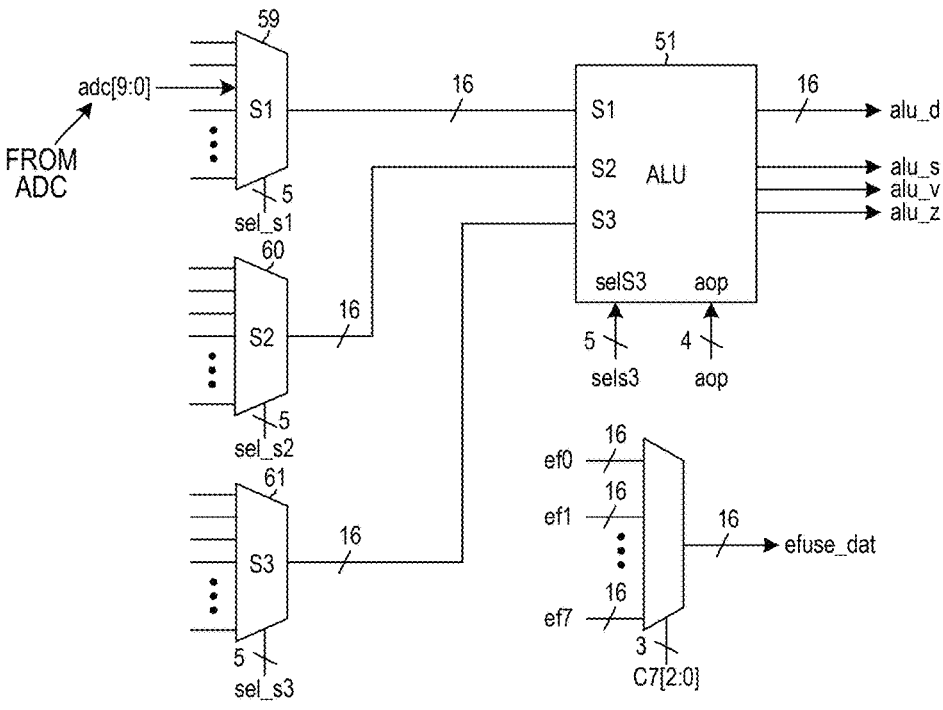
INPUT MUXES AND ALU
FIG. 5
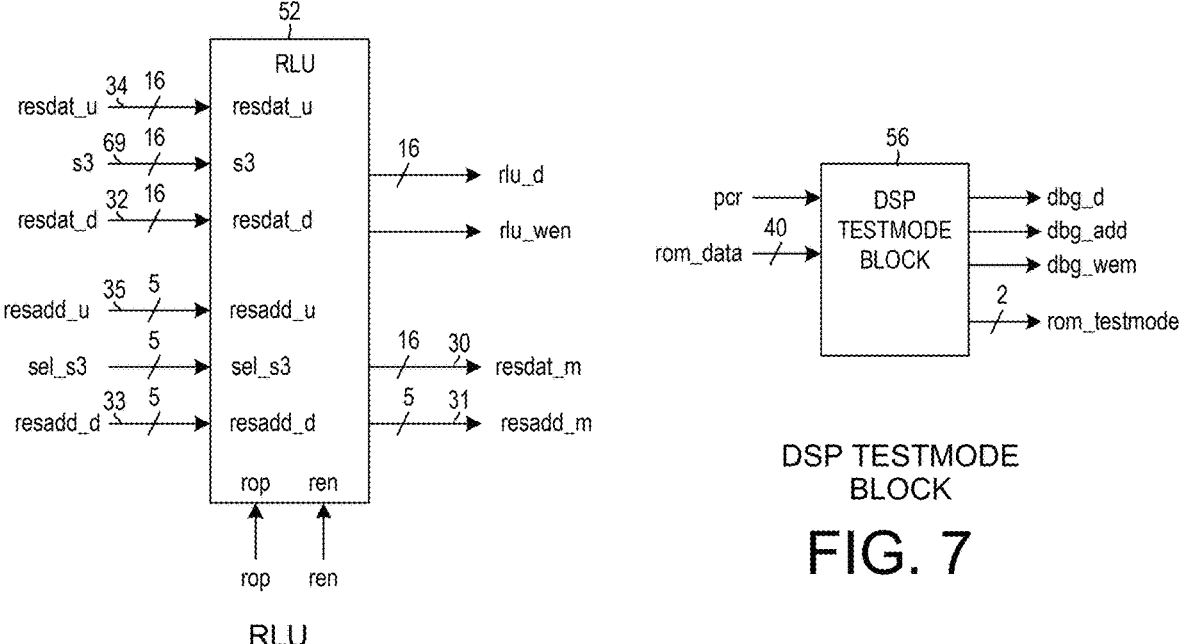
RLU
FIG. 6
DSP TESTMODE
BLOCK
FIG. 7

REGISTER BANK

CODE ROM AND CONTROL

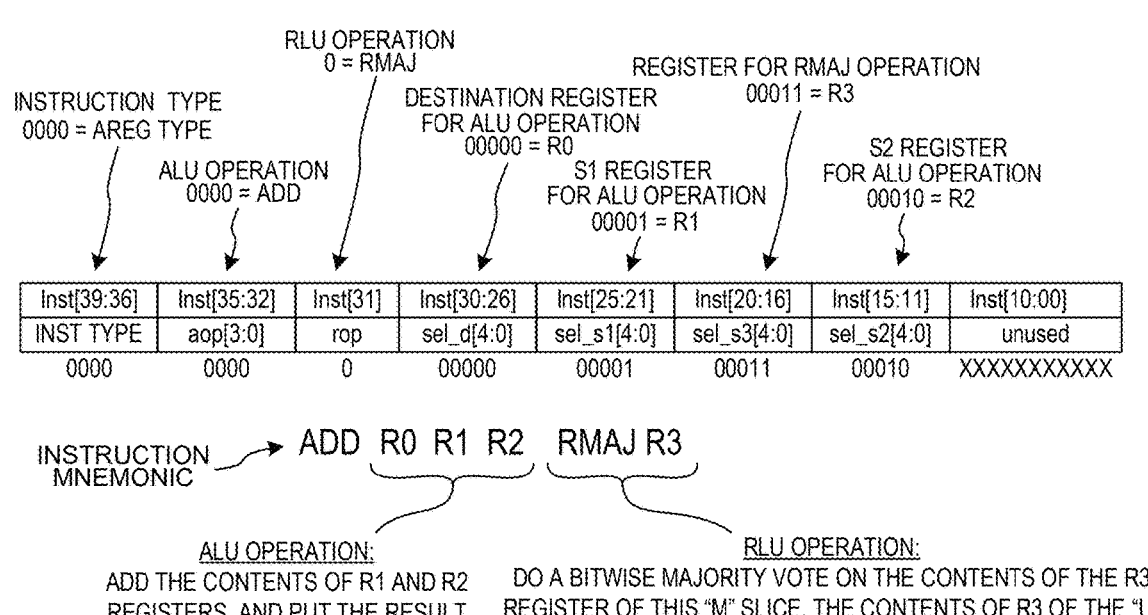

| Inst[39:36] | Inst[35:32] | Inst[31] | Inst[30:26] | Inst[25:21] | Inst[20:16] | Inst[15:11] | Inst[10:00] |
|---|---|---|---|---|---|---|---|
| INST TYPE | aop[3:0] | rop | sel_d[4:0] | sel_s1[4:0] | sel_s3[4:0] | sel_s2[4:0] | unused |
| 0000 | 0000 | 0 | 00000 | 00001 | 00011 | 00010 | XXXXXXXXXX |

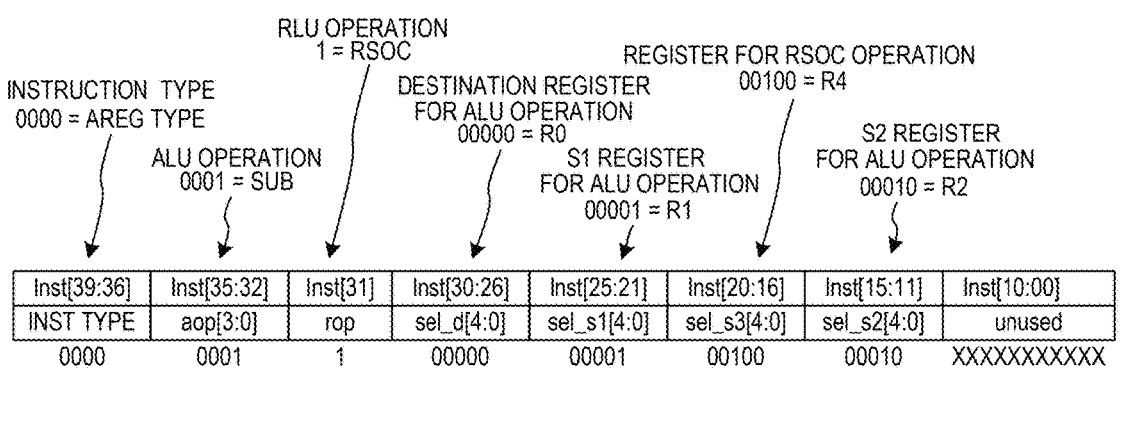

ADD R0 R1 R2    RMAJ R3

ALU OPERATION:
ADD THE CONTENTS OF R1 AND R2 REGISTERS, AND PUT THE RESULT INTO THE R0 REGISTER.

RLU OPERATION:
DO A BITWISE MAJORITY VOTE ON THE CONTENTS OF THE R3 REGISTER OF THIS "M" SLICE, THE CONTENTS OF R3 OF THE "U" SLICE, AND THE CONTENTS OF R3 OF THE "D" SLICE, AND PUT THE RESULT INTO THE R3 REGISTER OF THIS SLICE.

INSTRUCTION USING THE RMAJ OPERATION

FIG. 10

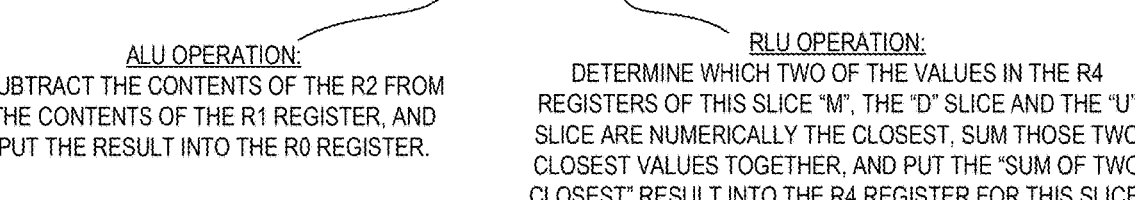

| Inst[39:36] | Inst[35:32] | Inst[31] | Inst[30:26] | Inst[25:21] | Inst[20:16] | Inst[15:11] | Inst[10:00] |
|---|---|---|---|---|---|---|---|
| INST TYPE | aop[3:0] | rop | sel_d[4:0] | sel_s1[4:0] | sel_s3[4:0] | sel_s2[4:0] | unused |
| 0000 | 0001 | 1 | 00000 | 00001 | 00100 | 00010 | XXXXXXXXXX |

SUB R0 R1 R2    RSOC R4

ALU OPERATION:
SUBTRACT THE CONTENTS OF THE R2 FROM THE CONTENTS OF THE R1 REGISTER, AND PUT THE RESULT INTO THE R0 REGISTER.

RLU OPERATION:
DETERMINE WHICH TWO OF THE VALUES IN THE R4 REGISTERS OF THIS SLICE "M", THE "D" SLICE AND THE "U" SLICE ARE NUMERICALLY THE CLOSEST, SUM THOSE TWO CLOSEST VALUES TOGETHER, AND PUT THE "SUM OF TWO CLOSEST" RESULT INTO THE R4 REGISTER FOR THIS SLICE.

INSTRUCTION USING THE RSOC OPERATION

FIG. 11

PROCESSOR EMPLOYING INSTRUCTION THAT PERFORMS A BITWISE MAJORITY VOTE OPERATION

GOVERNMENT SUPPORT

This invention was made with Government support under Contract No. 80LARC20C0005 awarded by the National Aeronautics and Space Administration (NASA). The Government has certain rights in the invention.

TECHNICAL FIELD

This disclosure relates to processors and to instructions executed by processors, and more particularly to reliable and fault tolerant so-called "rad-hard" and/or "rad-tolerant" processors that are suitable for use in applications (such as aerospace applications) where processor operation may be adversely affected by unwanted incident radiation.

BACKGROUND INFORMATION

In electronic systems intended to operate with high reliability in harsh environments including high radiation environments, the principle of triple modular redundancy is sometimes employed. A high energy particle may pass through a part of the electronic circuitry such that a state change occurs in a bit of the digital information stored in the circuitry. Such an erroneous change of state may be referred to as a single-event effect or a single-event upset. In an application of the triple modular redundancy principle, a signal path which could be corrupted by such a single-event upset is replicated to three or more replicated signal paths. The outputs of the replicated signal paths are passed through a majority voting system, which resolves differences between the multiple replicated paths, and outputs the result of the majority vote. Circuits and methods for implementing this triple modular redundancy principle are desired.

SUMMARY

A system includes a feedback control loop signal path. Circuitry of the signal path includes an integrated circuit. The integrated circuit includes three processors, a first digital majority voter circuit, and a second digital majority voter circuit. The three processors are also referred to as "slices." One or more analog sense signals from the system outside the integrated circuit are received onto the integrated circuit, and are supplied in parallel as analog input signals to each of the three processors. Each processor generates and outputs a first stream of digital values and a second stream of digital values. The first stream of digital values from each of the three processors is supplied as an input to the first digital majority voter circuit. The first digital majority voter circuit votes on values from the first streams from the three processors, and based thereon generates and outputs a first control signal that is output from the integrated circuit. The second digital majority voter circuit votes on values from the second streams from the three processors, and based thereon generates and outputs a second control signal that is output from the integrated circuit.

Each processor (each "slice") includes, among other parts, an analog-to-digital converter (ADC), a digital signal processor (DSP), and a digital-to-analog converter (DAC). The digital signal processor reads digital values output by the ADC. The digital signal processor generates digital output values, that are supplied as digital inputs to the DAC. The three processors are interconnected by three "resdat" buses such that each processor can supply the other two processors (of the other two slices) with a "resdat" register data value. The digital signal processors of the three slices execute identical programs of instructions, and are clocked in unison such that at any given time the DSPs of the three processors are executing the same instruction, and in the absence of a fault, are operating on the same data, and are therefore generating the same results.

In first novel aspect, the digital signal processor of the slice executes an instruction. The instruction, when executed, performs a "register bitwise majority vote" (RMAJ) operation. The instruction identifies a register of the slice, and the data content of this register of the slice is output from the slice and is supplied via a "resdat" bus to the two other slices. The digital signal processor performs a bitwise majority vote on: 1) the data content of the register, 2) the data content of the corresponding register in one of the other two slices received onto the DSP via a "resdat" bus, and 3) the data content of the corresponding register in the other of the other two slices received onto the DSP via a "resdat" bus. The result of the bitwise majority vote is written into the register of the slice, thereby overwriting the original data content of the register.

The digital signal processors of the three slices execute the same instruction at the same time, so the corresponding register in each slice is simultaneously over written with the same RMAJ result value. The instruction that causes the RMAJ operation to be performed sees use in resolving a single-event upset condition in which the state of one bit of a register in one of the slices is upset (for example, by a high energy particle) and erroneously changed. Because the digital signal processors of all three slices execute the same instruction to perform the RMAJ operation on the same register in their respective slices, the bitwise majority vote of each bit of the register will result in the erroneous bit state being outvoted. As a result, the identified register in each slice will simultaneously be written with the same corrected RMAJ result value as determined by the RMAJ operation.

In a second novel aspect, the digital signal processor of the slice executes an instruction. The instruction, when executed, performs a "register sum of two closest" (RSOC) operation. The instruction identifies a register of the slice, and the data content of this register of the slice is output from the slice and is supplied via a "resdat" bus to the two other slices. The digital signal processor performs a "sum of two closest" operation on: 1) the data content of the register, 2) the data content to the corresponding register in one of the other two slices received onto the DSP via a "resdat" bus, and 3) the data content of the corresponding register in the other of the other two slices received onto the DSP via a "resdat" bus. The digital signal processor determines which two of these three data content values are numerically the closest. The digital signal processor generates a result value that is a function of these two numerically closest values, and then writes the result value into the register, thereby overwriting the original data content of the register. In one embodiment, the result value is the sum of the two "numerically closest" data content values.

The three digital signal processors store and execute identical programs of instructions. The three digital signal processors are clocked synchronously. The digital signal processors of the three slices are made to execute the same instruction at the same time, so the corresponding register in each slice is simultaneously over written by the RSOC operation with the same result value. The instruction that causes the RSOC operation to be performed sees use in resolving disparities in analog-to-digital sampling (of the same analog signal) by the ADCs of the three slices. Despite proper operation of the analog-to-digital circuitry in the three slices, the three ADCs may nevertheless convert the same analog input to slightly different digital values. Proper operation of the RMAJ operation instructions in resolving single-event upset errors requires that the digital input values supplied as inputs to the digital processing paths of the three digital signal processors be identical in the condition in which there is no fault. The instruction that causes the RSOC operation is usable on the outputs of the three ADCs of the three slices. For example, in each slice the raw ADC output value can be placed in a register. Due to analog-to-digital conversion imperfections, these raw ADC output values in the three corresponding registers in the three slices may differ from each other. The digital signal processor in each slice is made to execute the instruction that causes the RSOC operation to be performed. Accordingly, the RSOC operation in each slice receives the same three raw ADC output values, and from these values determines the same "sum of two closest" result value. The processor in each slice therefore overwrites the ADC output value in its register (the register of the slice identified by the RSOC operation instruction) with the same RSOC result value. Because the digital signal processor of each slice executes the same instruction at the same time, the ADC output values in the corresponding register in each slice is overwritten with the same "sum of two closest" value. Subsequent processing in each feedback control signal path therefore starts and operates upon the same initial resolved ADC output value, and this allows the three digital processors to execute identical instructions on identical data, generating identical results, at each point in time during subsequent digital domain processing of the three identical signal paths.

Further details and embodiments and methods and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 is a more detailed block diagram of the input multiplexers and the ALU of FIG. 4.

FIG. 6 is a more detailed block diagram of the RLU of FIG. 4.

FIG. 7 is a more detailed block diagram of the DSP testmode block of FIG. 4.

FIG. 10 is a diagram of an instruction that, when executed, causes the register bitwise majority vote (RMAJ) operation to be performed.

FIG. 11 is a diagram of an instruction that, when executed, causes the sum of two closest (RSOC) operation to be performed.

DETAILED DESCRIPTION

Reference will now be made in detail to embodiments of the invention, examples of which are illustrated in the accompanying drawings.

Figures 1, 2:
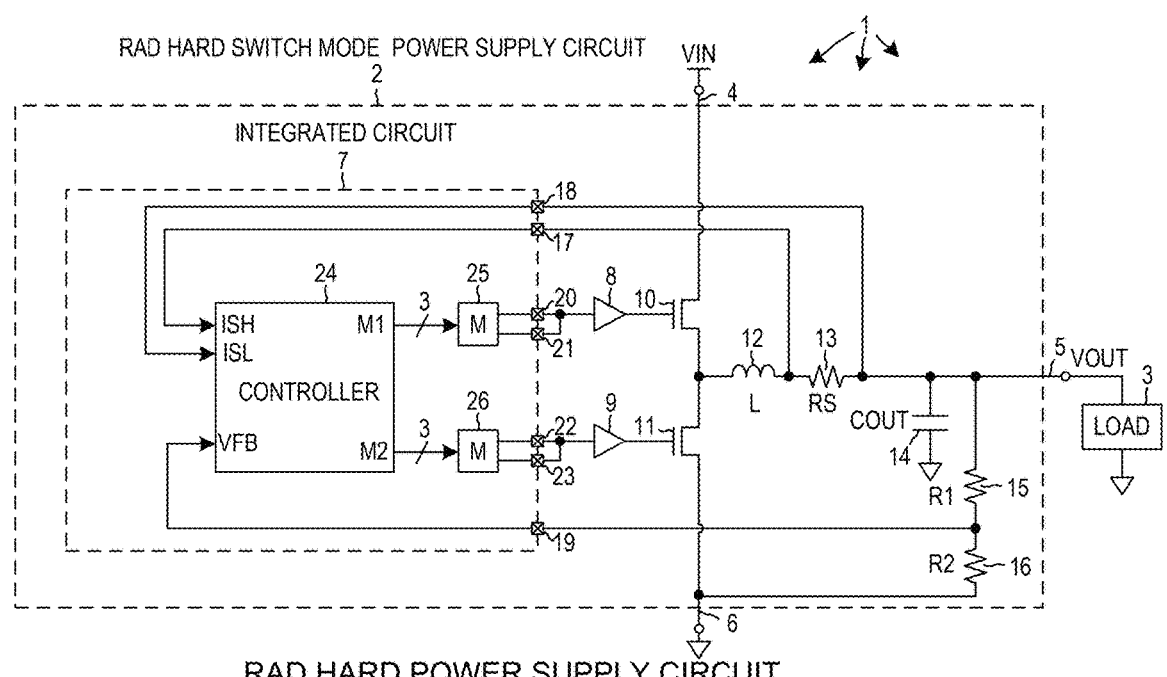
FIG. 1 is a simplified circuit diagram of a system that includes a switch mode power supply circuit.
FIG. 2 is a more detailed block diagram of the integrated circuit of the switch mode power supply circuit of FIG. 1.

FIG. 1 is a simplified circuit diagram of a system 1 including a radiation hardened ("rad-hard") or radiation tolerant ("rad-tolerant") switch mode power supply circuit 2 and a load 3. The power supply circuit 2 in this example is a step-down buck converter. The step-down buck converter receives a supply voltage VIN (for example, 28 volts DC) via input conductor and terminal 4, and generates therefrom a regulated and reliable 5 volt DC output supply voltage VOUT on output conductor and terminal 5. The input conductor and terminal 4 in one example is coupled a power bus of a spacecraft that carries the 28 volt DC supply voltage. Reference number 6 identifies a ground conductor and terminal.

The power supply circuit 2 includes an integrated circuit 7, two MOSFET driver integrated circuits 8 and 9, two power MOSFET devices 10 and 11, an inductor 12, an output current sense resister 13, an output capacitor 14, and two voltage divider sense resistors 15 and 16. The magnitude of the supply current being output by the power supply circuit 2 is sensed as a voltage dropped across the RS sense resistor 13, and this voltage is present between integrated circuit terminals 17 and 18. The sense resistors 15 and 16 that sense the output voltage VOUT form a voltage divider. This voltage divider generates a smaller sense voltage VFB that is proportional to the larger output voltage VOUT being supplied to the load 3. The sense voltage VFB is supplied to the integrated circuit 2 via integrated circuit terminal 19. A control signal for controlling the power MOSFET 10 is output from the integrated circuit 7 via integrated circuit terminals 20 and 21. A control signal for controlling the power MOSFET 11 is output from the integrated circuit 7 via integrated circuit terminals 22 and 23. The integrated circuit 7 is shown in very simplified form. Among other parts not illustrated, the integrated circuit 7 includes a controller portion 24 and two digital majority voter circuits 25 and 26.

FIG. 2 is a more detailed block diagram of the integrated circuit 7 of FIG. 1. Integrated circuit 7 includes three digital processors 27, 28 and 29, and six sets of conductors 30-35. Each set of conductors (also referred to as a bus) is a set of parallel extending conductors for carrying a multibit digital value from one of the processors to the other of the processors. The processors are also referred to as "slices." Each set of conductors denoted "resdat" carries a 16-bit data value. Each set of conductors denoted "resadd" carries a 5-bit address value. The first digital processor 27 is denoted "Slice 0", the second digital processor 28 is denoted "Slice 1", and the third digital processor 29 is denoted "Slice 2." One slice can drive a data value onto its associated "resdat" bus, but the other two slices cannot drive any signal onto that "resdat" bus but rather can only read and receive data values from that "resdat" bus. Similarly, for a "resadd" bus, one slice can drive an address value onto its associated "resadd"

bus, but the other two slices cannot drive any signal onto that "resadd" bus but rather can only read and receive address values from that "resadd" bus. In one example, the processor circuitry of each of the three slices is disposed and laid out in a different area of the integrated circuit, with the six sets of conductors 30-35 extending between and intercoupling the different areas.

Figures 3, 4:
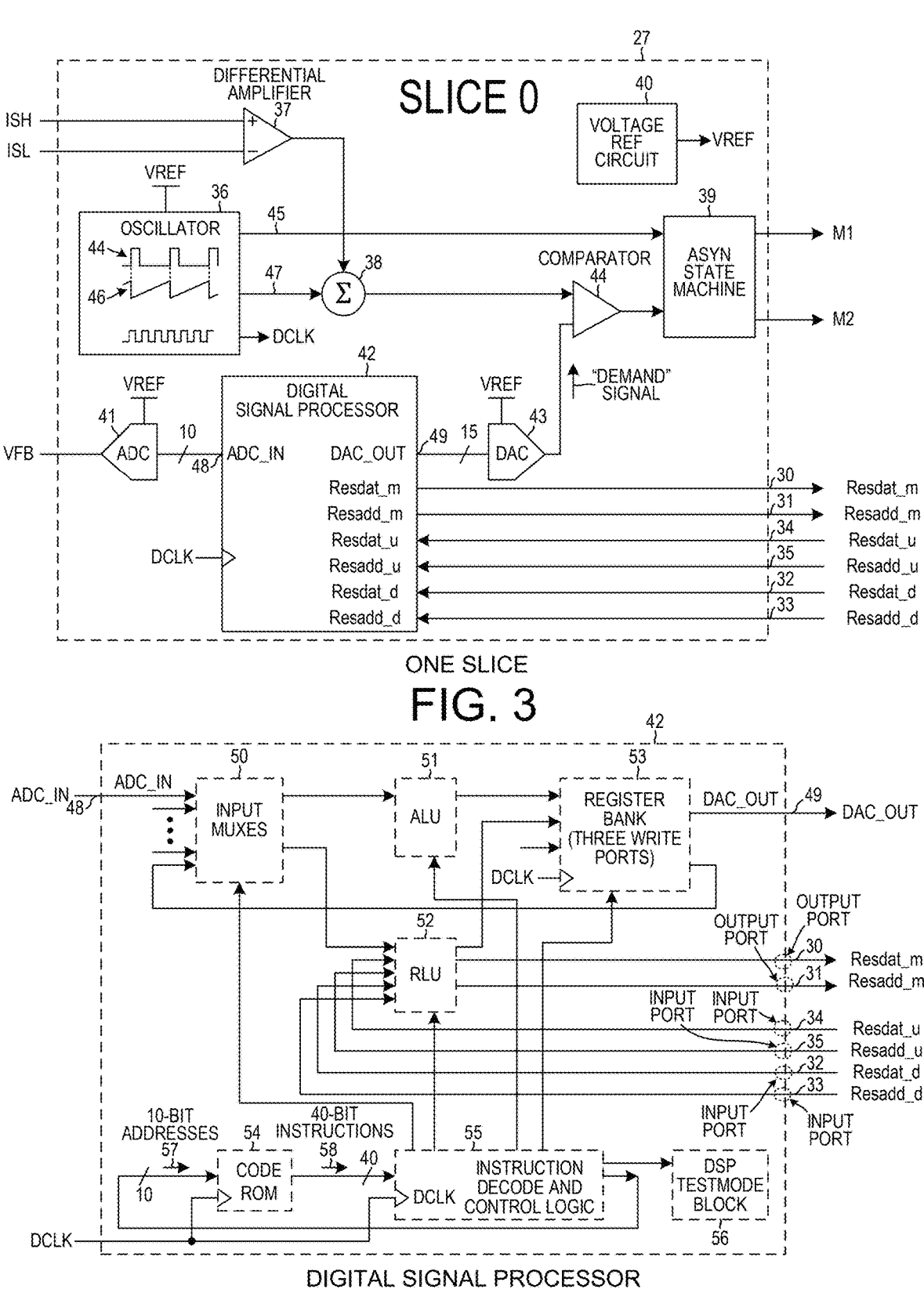
FIG. 3 is a more detailed block diagram of "Slice 0" of the integrated circuit of FIG. 2.
FIG. 4 is a more detailed block diagram of the digital signal processor (DSP) of "Slice 0" of FIG. 3.

FIG. 3 is a more detailed block diagram of "Slice 0" of FIG. 2. All three slices are of identical physical construction and integrated circuit layout, and have identical circuitry. All three slices execute identical programs of instructions. If operating properly, all three slices are, at a given time, executing the same instruction in their three respective copies of the program of instructions.

Slice 0 includes an internal oscillator 36, a differential amplifier 37, a summing amplifier 38, an asynchronous digital state machine 39, an internal voltage reference circuit 40, an analog-to-digital converter (ADC) 41, a digital signal processor (DSP) 42, a digital-to-analog converter (DAC) 43, and a comparator 44. The oscillator 36 is fully internal, and does not involve integrated circuit package terminals, nor does it include any external component such as an external crystal or other component external to the integrated circuit. The oscillators of the three slices are, however, synchronized so that they clock together in phase and at the same frequency. Oscillator 36 generates a pulse signal 44 and outputs that signal onto conductor 45 as illustrated. In addition, oscillator 36 generates a ramp signal 46 and outputs that signal onto conductor 47 as illustrated. The two signals 44 and 46 are synchronized with respect to each other as illustrated. Oscillator 36 also generates and outputs a 40 MHz digital clock signal DCLK that clocks the digital circuitry of the slice. Analog-to-digital converter (ADC) 41 is a 10-bit successive approximation analog-to-digital converter. DSP 42 receives a stream of 10-bit unsigned binary values from ADC 41 onto the input port 48 of the DSP. The DSP processes the stream of values from the ADC, and outputs a corresponding output stream of 15-bit values out of output port 49 to DAC 43. The M1 and M2 signals output by the slice are each 1-bit digital signals. As shown in FIG. 2, the three M1 signals output by the three slices are supplied as inputs to the digital majority voter circuit 25. Likewise, the three M2 signals output by the three slices are supplied as inputs to the digital majority voter circuit 26.

Control of the power supply circuit of FIG. 1 includes a relatively high-speed analog feedback control loop, and a relatively slower digital feedback control loop. The high-speed feedback control loop receives sense information from current sense resistor 13 is processes that information in the analog domain, whereas the lower speed voltage sense information from sense resistors 15 and 16 is processed in the slower digital feedback loop in the digital domain. Long time constants are moved into the digital domain. This includes compensation poles and zeros, soft-start time constants and delays. Current sense for current mode operation and slope compensation ramp are processed in the analog domain and passed to comparators (for example, comparator 44) which are fed a "demand" signal out of the digital compensation circuitry. The high-speed digital channels are provided in triplicate so as to ensure single event transient (SET) immunity. The low impedances and high speed of the current sense feedback control loop result in fast recovery of each channel from single events. All analog inputs are processed in triplicate and the three results are then majority voted in the digital domain by the digital majority voter circuits 25 and 26. The architecture employs triple physical bandgap references and data converters, with the digital circuitry picking which result values to use based on the two result values that are closest to each other. Having the analog circuitry being voted on allows for low current analog design, and this keeps total power dissipation low despite the high level of radiation hardness: one of the bandgap references can be SET (single event transient) perturbed with no impact on the system. The same is true for all the analog sections. In each slice, the output from the digital compensator is converted into the time domain with very fine resolution, to reduce jitter to negligible levels, using a guaranteed monotonic 15-bit DAC. The analog feedback loop circuitry is provided in triplicate and its result is voted on in order to provide SET immunity.

FIG. 4 is a more detailed block diagram of the DSP 42 of FIG. 3. DSP 42 includes input multiplexers 50, an arithmetic logic unit (ALU) 51, a resolver logic unit (RLU) 52, a register bank 53 having three write ports, code ROM 54, instruction decode and control logic 55, and a testmode block 56. The code ROM 54, which stores a program of 40-bit instructions, is 1024 words in size. Each word is forty bits. The ROM 54 is addressed by 10-bit addresses 57 received from the instruction decode and control logic 55. The ROM 54 supplies 40-bit instructions 58 to the instruction decode and control logic 55. The instruction decode and control logic 55 decodes an instruction received from ROM 54, and based on the results of this decoding controls the other portions 50-53 and 56 of the DSP.

Register bank 53 comprises thirty-two addressable 16-bit registers. The DSP 42 can read a 10-bit unsigned binary ADC output value from ADC 41 via input port and conductors 48. If the DSP performs a read of the register at address 0x19 of the register bank, the 10-bit unsigned binary value adc[9:0] is the value at bit positions 0 through 9 of the sixteen bit read.

The output leads of one of the 16-bit registers of the register bank 53 extend in parallel as output port and conductors 49 from the DSP 42 to the DAC 43. The DSP 42 can output a 15-bit value to the digital input of the DAC 43 by writing a 15-bit value into bits positions 0 through 14 of the register at address 0x19 in the register bank 53. The value written to bit position 15 is ignored, and is not supplied to the DAC because the DAC receives 15-bit values, not 16-bit values.

FIG. 5 is a more detailed block diagram of the input multiplexers 50 and the ALU 51 of FIG. 4. The S1 input multiplexer 59 supplies a 16-bit S1 value onto the S1 input port of ALU 51. The multiplexer input that is addressed by select input value 0x19 of this S1 input multiplexer is connected to the output of the ADC so as to receive the 10-bit ADC output value adc[9:0]. The 10-bit unsigned binary value adc[9:0] is the value at bit positions 0 through 9 of the register value that is read from register address 0x19 of the register bank 53. The S2 input multiplexer 60 supplies a 16-bit S2 value onto the S2 input port of ALU 51. The S3 input multiplexer 61 supplies a 16-bit S3 value onto the S3 input port of ALU 51. The multiplexer select values sel_s1, sel_s2, sel_s3, the ALU opcode aop, and the value sels3 are received from the instruction decode and control logic block 55. The 16-bit ALU output value alu_d is supplied as a data input to the first write port of the register bank 53.

FIG. 6 is a more detailed block diagram of the RLU 52. In this slice, there is a register of the register bank 53, the contents of which are to be "resolved" with the contents of the corresponding register in each of the other two slices. The 16-bit value on s3 the value in this register in this slice to be resolved. The 16-bit value resdat_u is the value in the corresponding register in the "u" slice (the slice that is conceptually "up" from this slice) that is to be resolved. The 16-bit value resdat_d is the value in the corresponding register in the "d" slice (the slice that is conceptually "down" from this slice) that is to be resolved. These three 16-bit values are received into the RLU via conductors 69, 34 and 32, respectively. The data result as output by the RLU is the 16-bit value rlu_d. This rlu_d value is written into a register in the register bank 53 using the write enable signal rlu_wen. This "m" slice (as opposed to the "u" slice and the "d" slice) outputs the value of the register to be resolved onto "resdat" conductors 30 (see FIG. 4) so that the value will be available to the RLUs in the other two slices. In addition, this "m" slice outputs onto "resadd" conductors 31 the address of the register to be resolved so that the address will be available to the RLUs in the other two slices. The RLU opcode signal rop and the RLU enable signal ren are received from the instruction decode and control logic block 55.

FIG. 7 is a more detailed block diagram of the DSP testmode block 56 of FIG. 4.

Figure 8:
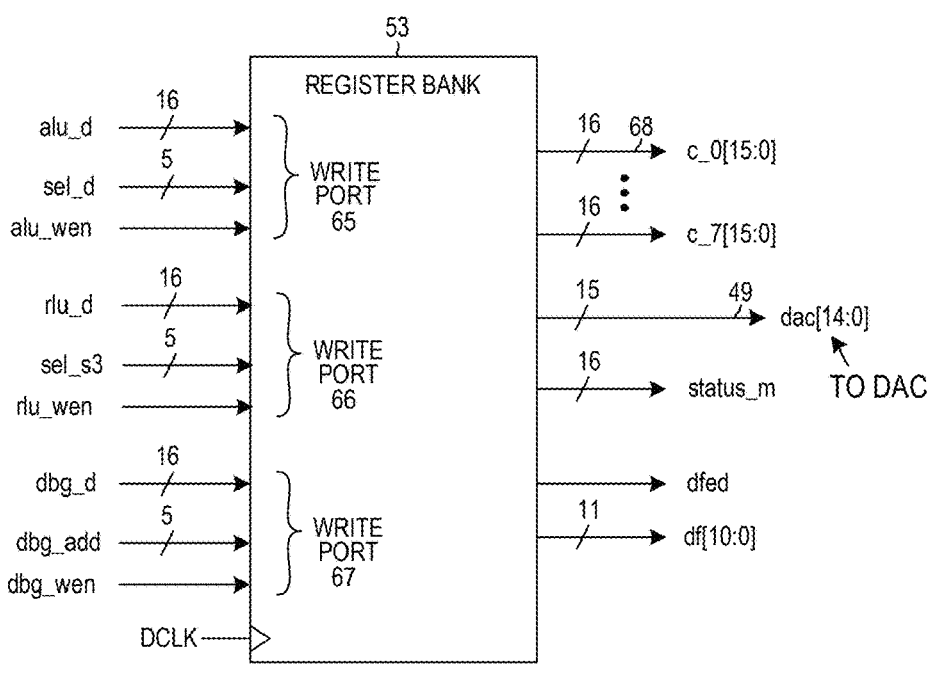
FIG. 8 is a more detailed block diagram of the register bank of FIG. 4.

FIG. 8 is a more detailed block diagram of the register bank 53 of FIG. 4. The register bank has three write ports 65, 66 and 67. A 16-bit value alu_d output by the ALU can be written into a selected register in the register bank using write port 65. A 16-bit value rlu_d output by the RLU can be written into a selected register in the register bank using write port 66. The contents of the various registers of the register bank 53 are available in parallel as output from the register bank 53 on corresponding sets of conductors. Some of these sets of conductors are illustrated in FIG. 8. For example, the content c_0[15:0] of one of the registers (the register denoted c_0) is output via a set of sixteen conductors 68. As indicated on the right side of the diagram of the register bank 53 in FIG. 8, there are eight such sets of conductors extending out from the register bank, one for each of registers c_0 through c_7.

The content of one of the registers (the register at address 0x19 denoted "dac") is output from the register bank 53 as the value dac[14:0] via the set of fifteen conductors and port 49. These conductors 49 extend from the register bank 43 to the input of the DAC 43 as indicated on FIG. 3. Accordingly, the DSP 42 outputs the value dac[14:0] to the DAC 43 by performing a write of the dac[14:0] value to the register located at register address 0x19. Bit 15 of the value written is ignored as is not supplied to the DAC 43 because the DAC receives 15-bit values, not 16-bit values.

Figure 9:
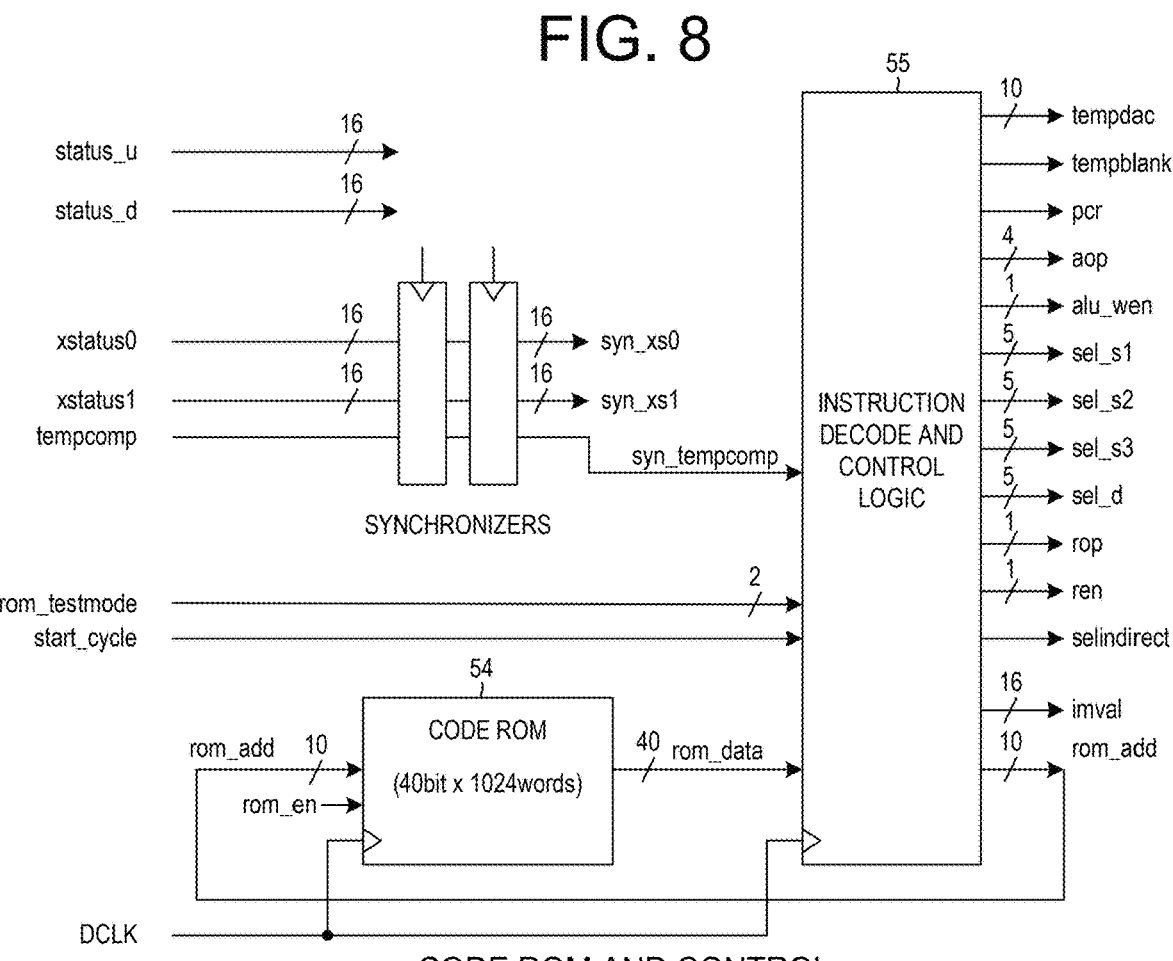
FIG. 9 is a more detailed diagram of the code ROM and the instruction decode and control logic of FIG. 4.

FIG. 9 is a more detailed diagram of the code ROM 54 and the instruction decode and control logic 55 of FIG. 4. As explained above, the ROM 54 stores a program of 40-bit instructions. The 10-bit address ROM 54 receives on the address input port of the ROM is the address of the 40-bit instruction that ROM 54 outputs to the instruction decode and control logic 55. The instruction decode and control logic 55 decodes the instruction received from the ROM, and generates control signals based on the results of this decoding. Some of these control signals are shown on the right side of the block 55 in the diagram of FIG. 9.

FIG. 10 is a diagram of an instruction that, when executed, causes an ALU operation to be performed and that also causes a RLU operation (RMAJ) to be performed. The ALU operation and the RLU operation are performed simultaneously. The instruction set of the DSP includes instructions that employ three source operands for their ALU operations. The instruction set of the DSP also includes other instructions that only use two source operands for their ALU operations. In the case of the instructions that employ only two source operands for their ALU operation, an RLU operation can be specified to occur such that the ALU operation and the RLU operation occur simultaneously when the instruction executes.

In the example of FIG. 10, the instruction illustrated is an ADD instruction having the mnemonic ADD R0 R1 R2 RMAJ R3. The first four bits inst[39:36] of the instruction are "0000" indicating that the type of instruction is the "AREG type" instruction. The next four bits inst[35:32] of the instruction is the ALU opcode. In the example of FIG. 10, the ALU opcode is "0000" indicating that the ALU operation of the instruction is an "ADD" operation. The next bit inst[31] of the instruction is the RLU opcode. In the example of FIG. 10, the RLU opcode is "0" indicating that the RLU operation performs the "register bitwise majority vote" operation on the contents of a specified register (RMAJ). Had the RLU opcode have been a "1" then the RLU operation would have been specified to be the RSOC operation.

The next five bits of the instruction inst[30:26] of FIG. 10 indicate the destination register of the ALU operation. In the example instruction, the value of inst[30:26] is "00000" indicating that the destination register for the ALU operation is the register in the register bank that has a register bank address of "00000". The next five bits inst[25:21] of the instruction contains the value of the multiplexer select value sel_s1. In the example instruction of FIG. 10, this sel_s1 value is "00001" indicating that the input multiplexer S1 59 (see FIG. 5) is controlled to supply the content of the register in the register bank having an address of "00001" onto the S1 input of the ALU 51. The next five bits inst[20:16] of the instruction contains the value of the multiplexer select value sel_s3. In the example instruction of FIG. 10, this sel_s3 value is "00011" indicating that the register of the register bank that is to be "resolved" by the RMAJ operation is the register having a register bank address of "00011". The 5-bit value inst[20:16] should be the address of a general purpose register, all the bits of which can be read and written by the RMAJ operation. The next five bits inst[15:11] of the instruction contains the value of the multiplexer select value sel_s2. In the example instruction of FIG. 10, this sel_s2 value is "00010" indicating that the input multiplexer S2 60 is controlled to supply the content of the register in the register bank having an address of "00010" onto the S2 input of the ALU 51. The last eleven bits inst[10:00] of the instruction are not used, so the values of these bits are don't cares.

When the instruction of FIG. 10 is executed, the ALU opcode aop of the instruction causes the input multiplexers to set up and the ALU to be controlled such that the 16-bit value in the R2 register (addressed by inst[15:11]) is added by the ALU to the 16-bit value in the R1 register (addressed by inst[25:21], and the resulting 16-bit value is then written into the destination register R0 (addressed by inst[30:26]). The RLU opcode rop of the instruction (which in this case is "0") causes the RLU 52 to be set up to output the 16-bit value of the register identified by inst[20:16] onto the resdat m conductors 30 so that the other two slices will have this 16-bit data value available for their respective RMAJ operations. In addition, the RLU rop of the instruction causes the RLU 52 to be set up to output the 5-bit register bank address (a 5-bit address value) of the register onto the resadd m conductors 31 so that the other two slices will have this 5-bit address address value available for their respective RMAJ operations. The RLU opcode rop also sets up the S3 multiplexer to supply the 16-bit data value stored in the register addressed by address value in the inst[20:16] to be supplied on conductors 69 as one operand to the RLU s3. The 16-bit data value on the resdat u conductors 34 is present on the resdat_u input port of the RLU, so the data value stored in the register in the "u" slice is provided to the RLU 52. In addition, the 16 bit data value on the resdat d conductors 32 is present on the resdat_d input port of the RLU, so the data value stored in the register in the "d" slice is provided to the RLU 52. The RLU 52 performs a bitwise majority vote operation on the three values (the value on the resdat_u input port of RLU 52, the value on the s3 input port of RLU 52, and the value on the resdat_d input port of RLU 52), and the 16-bit result value is output from the RLU on the rlu_d conductors. The RLU write enable signal rlu_wen is asserted high, thereby causing the 16-bit result value to be written into the general purpose R3 register (the register in the register bank addressed by the inst[20:16] bits).

This write of the RLU RMAJ operation, however, is a conditional write. The write only occurs if the address being output by the slice "u" resadd_u, and the address being output by the slice "d" resadd_d, and the address being output by this slice "resadd_m" all match. The RLU checks for this matching condition. If the three address values do not match, then the condition (of the conditional write) is not satisfied, and the RLU does not perform the conditional write of the result data value into the register bank. Notably, execution of the instruction illustrated in FIG. 10 causes both the ALU operation as well as the RMAJ RLU operation to be performed simultaneously.

The RMAJ operation sees special use in resolving faults in single-event transient or signal-event upset situations. Consider a situation in which an energetic particle travels through a part of the integrated circuit 7 such as one bit of a register (for example, one bit of the register in register bank 53 that is addressed by register bank address "00011") in one of the slices (for example, in Slice 0). The energetic particle may cause the data bit stored to be changed from the digital value it should be (for example, a digital "0") to the opposite and incorrect digital value. Each of the programs executing in the three digital processors 27-29 of the integrated circuit are all made to include the same instruction illustrated in FIG. 10, located in the same location in each program. When the digital signal processor 42 in Slice 0 executes the instruction, the processor 42 will read the value of the corresponding register in Slice 1 (the register stored at address "00011" in the register bank of Slice 1) and the value of the corresponding register in Slice 2 (the register stored at address "00011" in the register bank of Slice 2). The processor of Slice 0 will do a bitwise majority vote operation on three values: 1) the register in Slice 0 (the register stored at address "00011" in the register bank of Slice 0), 2) the register in Slice 1 (the register stored at address "00011" in the register bank of Slice 1), and 3) the register in Slice 2 (the register stored at address "00011" in the register bank of Slice 2). The bitwise majority vote will, for the bit position of the erroneous bit of the value stored in Slice 0, determine that the majority vote is "0" value because the corresponding bits of Slices 1 and 2 were "0" values (due to their not having been affected by the single event upset occurrence. As a result, the processor of Slice 0 will overwrite the contents of its "00011" register with the result value as output by the RLU, which is the correct value, such that the erroneous "1" bit is rewritten to be the correct "0" value. In the same way, the processor of each of the other two slices will overwrite the value in its register (its register addressed at address value "00011") with the bitwise majority vote value as determined by that processor. In this way, the single-event fault is detected and corrected.

In the overall fault tolerant system of FIG. 1, the majority voting scheme outlined above works because each of the three replicated digital feedback paths receives identical input values and therefore should also have identical state in every bit of every multi-bit bus. It is necessary to ensure that all bits that are voted on have the same state in each of the three digital feedback paths when there is NOT a fault occurring. Each digital feedback path has its own ADC, so it is necessary that each of these three ADCs supplies the same digital value to the remainder of its respective digital feedback path. Because the analog signal VOUT to be measured on the output of the power supply circuit is not discrete and the function of an ADC is to convert that analog signal to a discrete digital value, and because there are imperfections in any analog-to-digital conversion process, there exists a degree of uncertainty regarding what digital output an ADC will produce for a given analog input. Such imperfections in the analog-to-digital conversion process may be due to noise in the ADC, linearity errors in the ADC, offset errors in the ADC, and gain errors in the ADC. Such errors in the analog-to-digital conversions performed by the three ADCs of the system of FIG. 1 could be corrected by some sort of digital algorithm that analyzes the data and reduces the impact of "bad data", e.g. by averaging or detecting "outliers" in the data and replacing such bad data with an interpolated value so that all three analog-to-digital conversions occurring in the system at a given time will output the same digital conversion value, but such a method would degrade the accuracy and/or the bandwidth of information available from the ADC system. Bitwise majority voting could be applied to the three digital outputs of the three ADCs, but bitwise majority voting would not work correctly where the three digital outputs in a no-fault situation differ from each other by more than one digital bit. In the system of FIG. 1, in a no-fault situation, the three ADCs may output three respective digital output values whose bits differ from one other by more than one bit.

In accordance with another novel aspect, the digital signal processor 42 of the slice executes an instruction that causes a novel "sum of two closest" RLU operation to be performed. This "sum of two closest" RLU operation is usable on the ADC output values of the three digital feedback paths so that from the three ADC output values, a single digital value will be generated so that in each digital feedback path the same ADC output value will be made to pass through the remainder of the digital processing of the feedback path. In each slice, the ADC output value is read by the DSP from the slice's 0x19 register, and is placed into one of the slice's general purpose registers (for example, register R4 at register address "00100") for subsequent resolving by the RSOC operation.

FIG. 11 is a diagram of an instruction that, when executed, causes an ALU operation to be performed and that also causes a RLU operation (RSOC) to be performed. In the example of FIG. 11, the instruction illustrated is a SUB instruction having the mnemonic SUB R0 R1 R2 RSOC R4. The first four bits inst[39:36] of the instruction are "0000" indicating that the type of instruction is the "AREG type" instruction. The next four bits inst[35:32] of the instruction is the ALU opcode. In the example of FIG. 11, the ALU opcode is "0001" indicating that the ALU operation of the instruction is an "SUB" operation. The next bit inst[31] of the instruction is the RLU opcode. In the example of FIG. 11, the RLU opcode is "1" indicating that the RLU performs the "sum of two closest" operation on the contents of a specified register (RSOC). The next five bits of the instruction inst[30:26] of FIG. 11 indicate the destination register of the ALU operation. In the example instruction, the value of inst[30:26] is "00000" indicating that the destination register for the ALU operation is the register in the register bank that has a register bank address of "00000". The next five bits inst[25:21] of the instruction contains the value of the multiplexer select value sel_s1. In the example instruction of FIG. 11, this sel_s1 value is "00001" indicating that the input multiplexer S1 59 (see FIG. 5) is controlled to supply the content of the register in the register bank having an address of "00001" onto the S1 input of the ALU 51. The next five bits inst[20:16] of the instruction contains the value of the multiplexer select value sel_s3. In the example instruction of FIG. 11, this sel_s3 value is "00100" indicating that the register of the register bank that is to be "resolved" by the RSOC operation is the general purpose register R4 that has a register bank address of "00100". The 5-bit value inst[20:16] should be the address of a general purpose register, all the bits of which can be read and written by the RSOC operation. The field inst[20:16] of the instruction identifies this general purpose register whose contents are to be "resolved" by the RSOC operation. The next five bits inst[15:11] of the instruction contains the value of the multiplexer select value sel_s2. In the example instruction of FIG. 11, this sel_s2 value is "00010" indicating that the input multiplexer S2 60 is controlled to supply the content of the register in the register bank having an address of "00010" onto the S2 input of the ALU 51. The last eleven bits inst[10:00] of the instruction are not used, so the values of these bits are don't cares.

Execution of the instruction of FIG. 11 causes the ALU to perform the designated ALU subtract operation SUB. The contents of the register R2 (addressed by register address "00010") is subtracted from the contents of the register R1 (addressed by register address "00001"), and the result value is loaded into the register R0 (addressed by register address "00000"). Execution of the instruction of FIG. 11 simultaneously causes the RLU to perform the RLU "sum of two closest" operation RSOC.

The RSOC operation operates on the contents of the register identified by the inst[20:16] bits (the register R4 addressed by register address "00100") of this slice "m", the contents of the corresponding register R4 (the register R4 addressed by register address "00100") of the slice "u", and the contents of the corresponding register R4 (the register R4 addressed by register address "00100") of the slice "d". The value stored in the specified register (the register addressed by the address in field inst[20:16]) is output by the slice onto the resdat data bus (see data buses 30-35 of FIG. 2) used by the "m" slice to supply data to the other slices. The RLU of the slice also receives such resdat data from the "u" slice via another of the resdat buses, and also receives such resdat data from the "d" slice via yet another of the resdat buses.

The RLU determines the absolute difference between the "m" and "u" R4 values, the absolute difference between the "m" and "d" R4 values, and the absolute difference between the "u" and "d" R4 values. From these three absolute difference values, the RLU determines the pair of values that has the smallest absolute numerical difference between them. These two numbers are summed together, and that sum is written into the designated register R4 (the register identified by the "00100" address in the inst[20:16] field of the instruction) of this slice "m".

It is noted that this "sum of two closest" number is twice the average of the two values that were determined to be closest to each other. If, however, the three values "m" "u" and "d" are such that the lowest and highest values are equidistant from the mid value, then there is a dilemma as to whether to output the sum of the two upper values, or the sum of the two lower values, or a value that is two times the mid value. Any of these may be used in a given embodiment. In the presently described embodiment, the RSOC operation writes a value into the R4 register that is two times (twice) the mid value.

Figure 12:
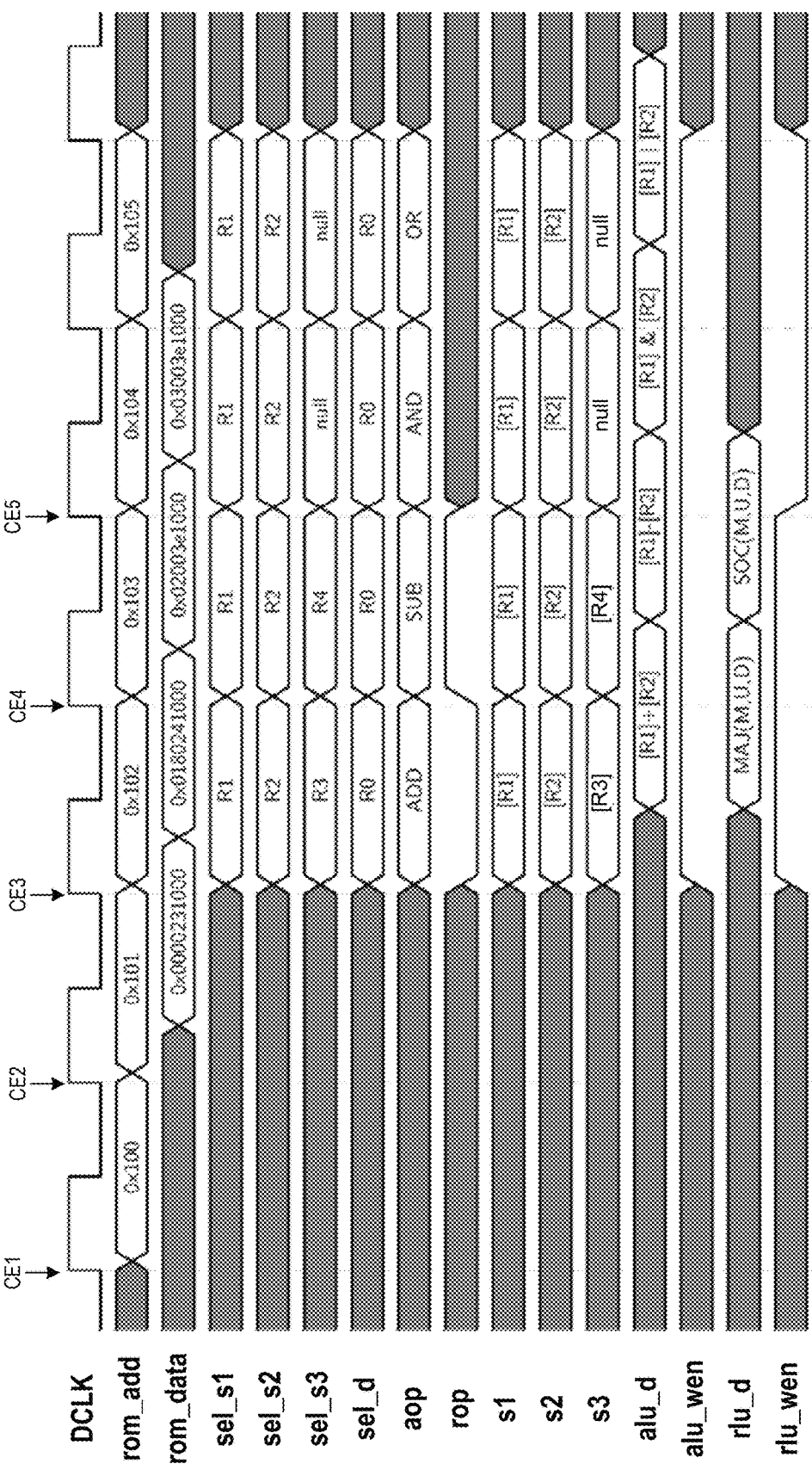
FIG. 12 is a waveform diagram that illustrates operation of the digital signal processor of Slice 0 of FIG. 3 when it executes instructions, including executing a first instruction involving an RMAJ operation, and then executing a second instruction involving an RSOC operation.

FIG. 12 is a waveform diagram that illustrates operation of the digital signal processor 42 of Slice 0 executing multiple instructions, including a first instruction involving an RMAJ operation, and then a second instruction involving an RSOC operation. In the diagram, the signal DCLK is the clock signal for the processor 42. The multi-bit signal rom_add is the address supplied to the ROM where the instructions are stored. The ROM latches the multi-bit address value on rom_add when DCLK rises and starts a ROM read operation. The multi-bit signal labeled rom_data is the 40-bit data being output by the ROM, which becomes valid some time after the rising edge of DCLK. The multi-bit signal sel_s1 is the signal that selects which value is put onto the s1 bus. The multi-bit signal sel_s2 is the signal that selects which value is put onto the s2 bus. The multi-bit signal sel_s3 is the signal that selects which value is put onto the s3 bus. For a RMAJ or RSOC operation, the value of sel_s3 identifies the register where the RLU result value will be written. The multi-bit signal sel_d is the signal that selects which register in the register bank will be written on a rising edge of DCLK if alu_wen is high. The multi-bit signal aop is the signal that selects which arithmetic operation the ALU will perform. The single-bit signal rop selects which resolver operation the RLU will perform. The multi-bit signal s1 is the value on the s1 bus. The multi-bit signal s2 is the value on the s2 bus. The multi-bit signal s3 is the value on the s3 bus. The signal alu_d is the value output by the ALU. The single-bit signal alu_wen is the enable signal that if high, the value on alu_d will be latched into the register selected by sel_d. The multi-bit signal rlu_d is the value output of the RLU. If the signal rlu_wen is high, then the RLU output value on rlu_d will be latched into the register selected by sel_s3 (this is only active if there is an RLU instruction being executed). On the diagram, the notation [R1] represents the value stored in register R1. The notation 0x100 represents a hexadecimal value of 100.

The first clock edge CE1 causes the address 0x100 to be supplied onto the address inputs of the ROM. Following the second clock edge CE2, the ROM outputs the 40-bit contents 0x0000231000 stored at address 0x100. The clock edge CE2 also causes the second address 0x101 to be supplied onto the address inputs of the ROM. Following the third clock edge CE3, the input multiplexers supply the appropriate values (for execution of the first instruction) onto the inputs of the ALU and the RLU. As shown in the waveform labeled "s3", the value stored in register R3 supplied onto the s3 bus, and to the RLU. At some point into the third clock period following the third clock edge CE3, the value alu_d is valid on the output of the ALU. Similarly, the value rlu_d is valid on the output of the RLU. The signal rop is low, indicating that the RLU operation is the RMAJ operation. The alu_d value as output by the ALU is then clocked into the designated register (register R0) by the fourth clock edge CE4. At the same time, the rlu_d value output by the RLU is clocked into the register designated by sel_s3 (sel_3 is the address of register R3) by the fourth clock edge CE4. Following the fourth clock edge CE4, the values to be supplied onto the inputs of the ALU and onto the inputs of the RLU for the second instruction (the 0x0180241000 instruction) are valid on the appropriate inputs of the ALU and RLU. During the fourth clock period, the signal rop is high, indicating that the RLU operation is the RSOC operation. The alu_d value as output by the ALU is then clocked into the designated register (register R0) by the fifth clock edge CE5. At the same time, the rlu_d value output by the RLU is clocked into the register designated by sel_s3 (sel_3 is the address of register R4) by the fifth clock edge CE5.

Although an embodiment of an instruction involving the RMAJ operation is described above (in connection with FIG. 10) that involves checking that the three addresses of the three registers (identified by the address value in inst [20:16]) in the three slices are identical, such that the RMAJ result value is only written into the designated register if the three addresses are identical, in other embodiments there is no checking of addresses and the write is not a conditional write. In some embodiments, the resadd buses are not provided, and no checking of register addresses is performed.

Although an embodiment of an instruction involving an RLU operation usable for resolving analog signal sampling errors is described above (in connection with FIG. 11) that involves writing a "sum of the two closest" value into the identified register (identified by the address value in inst[20: 16]), in other embodiments a value that is another function (other than the sum function) of only the two closest values, and that is not a function of the third value, is determined to be the result value. For example, the function can be an average function such that the result value is determined to be the average of the two closest values, but is not a function of the third value. The function can be an average of weighted versions of the two closest values, or the sum of weighted versions of the two closest values. In each case, however, the function is not a function of the third value, which is determined to be an outlier, and is not used. Accordingly, the term "sum of two closest" as it is used here includes both the sum of two closest, as well as the sum of two closest divided by two. Preferably, the sum of two closest value is determined by the RLU using simple integer arithmetic.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method, comprising:

(a) storing a first instruction in a first processor;

(b) storing a first register value in a first register of the first processor;

(c) storing a second instruction in a second processor;

(d) storing a second register value in a second register of the second processor;

(e) storing a third instruction in a third processor;

(f) storing a third register value in a third register of the third processor;

(g) executing the first instruction on the first processor, wherein the executing of (g) causes the first register value to be output from the first processor and to be supplied to the second processor and to the third processor;

(h) executing the third instruction on the third processor, wherein the executing of (h) causes the third register value to be output from the third processor and to be supplied to the first processor and to the second processor; and (i) executing the second instruction on the second processor, wherein the executing of (i) causes the second register value to be output from the second processor and to be supplied to the first processor and to the third processor, wherein the executing of (i) further causes the second processor to perform a bitwise majority vote operation on the first register value, the second register value and the third register value thereby generating a result value, and wherein the executing of (i) further causes the result value to be written into the second register of the second processor.

2. The method of claim 1, wherein the first instruction, the second instruction, and the third instruction are bitwise identical instructions.

3. The method of claim 1, wherein the first register value, the second register value, and the third register value are bitwise identical values.

4. The method of claim 1, wherein the second processor comprises a plurality of registers, wherein the second register that stores the second register value in (d) is a selectable one of the plurality of registers, wherein the second instruction includes a register identifying value that indicates which one of the plurality of registers it is that is selected to be the second register.

5. The method of claim 1, wherein the executing of the second instruction in (i) further causes the second processor to perform an arithmetic logic unit (ALU) operation that is not a bitwise majority vote operation.

6. The method of claim 1, wherein the second instruction includes a register identifying value, an arithmetic logic unit (ALU) source value, and an arithmetic logic unit (ALU) destination value, wherein the register identifying value identifies the second register of the second processor, wherein the executing of the second instruction in (i) further causes the second processor to perform an ALU operation thereby generating an ALU result value and causing the ALU result value to be written into a register of the second processor identified by the ALU destination value.

7. The method of claim 1, wherein the executing of the first instruction in (g) further causes a first address associated with the first register to be output from the first processor and to be supplied to the second processor and to the third processor, wherein the executing of the third instruction in (h) further causes a third address associated with the third register to be output from the third processor and to be supplied to the first processor and to the second, wherein the executing of the second instruction in (i) further causes a second address associated with the second register to be output from the second processor and to be supplied to the first processor and to the third processor, and wherein the executing of the second instruction in (i) further causes the second processor to determine whether the first address, the second address, and the third address are bitwise equal.

8. The method of claim 1, wherein the writing of the result value into the second register of the second processor due to the executing of the second instruction on the second processor in (i) is a conditional write that only occurs if a condition is satisfied, wherein the executing of the second instruction in (i) further causes the second processor to determine whether the condition is satisfied.

9. The method of claim 8, wherein the condition is satisfied if a first address value output by the first processor and a third address value output by the third processor are bitwise equal to a register identifying value, wherein the second processor comprises a plurality of registers, wherein the second register that stores the second register value in (d) is a selectable one of the plurality of registers, wherein the second instruction includes the register identifying value, and wherein the register identifying value indicates which one of the plurality of registers it is that is selected to be the second register.

10. The method of claim 1, wherein the first processor is a first slice portion of an integrated circuit, wherein the second processor is a second slice portion of the integrated circuit, and wherein the third processor is a third slice portion of the integrated circuit.

11. An integrated circuit, comprising:
    a first digital processor circuit comprising:
        a first input port;
        a second input port;
        a register that stores a register value;
        a memory that stores an instruction, wherein the instruction includes a register identifying value that identifies the register; and
        means for (a) reading the instruction from the memory, (b) executing the instruction by performing a bitwise majority vote operation on the register value, a first value received onto the first digital processor circuit via the first input port, and a second value received onto the first digital processor circuit via the second input port, thereby generating a result value, and writing the result value into the register, wherein the writing of the result value into the register by the means is a conditional write that only occurs if a condition is satisfied, and wherein the means is also for determining whether the condition is satisfied, wherein the condition is satisfied if a first address value and a second address value are both bitwise equal to the register identifying value, wherein the first address value is a value received onto the first digital processor circuit via a third input port, and wherein the second address value is a value received onto the first digital processor circuit via a fourth input port.

12. The integrated circuit of claim 11, wherein the first digital processor circuit further comprises an output port, and wherein the executing of the instruction by the means further comprises outputting the register value from the first digital processor circuit by supplying the register value onto the output port.

13. The integrated circuit of claim 11, wherein the means comprises a plurality of input multiplexers, an arithmetic logic unit (ALU), a resolver logic unit (RLU), and instruction decode and control logic.

14. The integrated circuit of claim 11, wherein the first input port is a first set of conductors, wherein the second input port is a second set of conductors, wherein the register is one register of a register bank, and wherein the register identifying value is an address value that addresses the register of the register bank.

15. The integrated circuit of claim 11, wherein the first digital processor circuit outputs first processor register output values, the integrated circuit further comprising:
    a second digital processor circuit that outputs second processor register output values;
    a third digital processor circuit that outputs third processor register output values; and
    a digital majority voter circuit, wherein the digital majority voter circuit has a first input that is coupled to receive the first processor register output values from the first digital processor circuit, wherein the digital majority voter circuit has a second input that is coupled to receive the second processor register output values from the second digital processor circuit, and wherein the digital majority voter circuit has a third input that is coupled to receive the third processor register output values from the third digital processor circuit.

16. The integrated circuit of claim 11, further comprising:
    a second digital processor circuit that supplies the first value to the first input port of the first digital processor circuit; and
    a third digital processor circuit that supplies the second value to the second input port of the first digital processor circuit.

17. An integrated circuit, comprising:
    a first digital processor circuit comprising:
        means for executing an instruction such that a bitwise majority vote operation is performed on a register value stored in a selectable register of the first digital processor circuit and two other register values thereby obtaining a result value, and for writing the result value into the selectable register of the first digital processor circuit;
    a second digital processor circuit comprising:
        means for executing an instruction such that a bitwise majority vote operation is performed on a register value stored in a selectable register of the second digital processor circuit and two other register values thereby obtaining a result value, and for writing the result value into the selectable register of the second digital processor circuit;
    a third digital processor circuit comprising:
        means for executing an instruction such that a bitwise majority vote operation is performed on a register value stored in a selectable register of the third digital processor circuit and two other register values thereby obtaining a result value, and for writing the result value into the selectable register of the third digital processor circuit; and
    a digital majority voter circuit having a first input, a second input, and a third input, wherein the first input is coupled to receive a digital value output by the first digital processor circuit, wherein the second input is coupled to receive a digital value output by the second digital processor circuit, and wherein the third input is coupled to receive a digital value output by the third digital processor circuit,
    wherein the means for executing of the first digital processor circuit receives one of the two other register values from the second processor circuit and receives the other of the two other register values from the third processor circuit, wherein the means for executing of the second digital processor circuit receives one of the two other register values from the first processor circuit and receives the other of the two other register values from the third processor circuit, and wherein the means for executing of the third digital processor circuit receives one of the two other register values from the first processor circuit and receives the other of the two other register values from the second processor circuit.

18. The integrated circuit of claim 17, further comprising:
    an integrated circuit terminal, wherein the digital majority voter circuit is coupled to supply a control signal onto the integrated circuit terminal.

19. The integrated circuit of claim 17, further comprising:
    an integrated circuit terminal, wherein the digital majority voter circuit has an output, wherein the output of the digital majority voter circuit is coupled to supply a control signal onto the integrated circuit terminal.

20. The integrated circuit of claim 17, further comprising:

a first bus that, during execution of the instruction by the means of the first digital processor circuit, supplies the register value stored in the selectable register of the first digital processor circuit to both the second digital processor circuit and to the third digital processor circuit;

a second bus that, during execution of the instruction by the means of the second digital processor circuit, supplies the register value stored in the selectable register of the second digital processor circuit to both the first digital processor circuit and to the third digital processor circuit; and a third bus that, during execution of the instruction by the means of the third digital processor circuit, supplies the register value stored in the selectable register of the third digital processor circuit to both the first digital processor circuit and to the second digital processor circuit.

21. The integrated circuit of claim 17, wherein the executing of the instruction by the means of the first digital processing circuit causes the means also to perform another operation that is not a bitwise majority vote operation.

22. An integrated circuit, comprising:

a first digital processor circuit comprising:

a processor output register; and means for executing an instruction such that a bitwise majority vote operation is performed on a register value stored in a selectable register of the first digital processor circuit and two other register values thereby obtaining a result value, and for writing the result value into the selectable register of the first digital processor circuit;

a second digital processor circuit comprising:

a processor output register; and means for executing an instruction such that a bitwise majority vote operation is performed on a register value stored in a selectable register of the second digital processor circuit and two other register values thereby obtaining a result value, and for writing the result value into the selectable register of the second digital processor circuit;

a third digital processor circuit comprising:

a processor output register; and means for executing an instruction such that a bitwise majority vote operation is performed on a register value stored in a selectable register of the third digital processor circuit and two other register values thereby obtaining a result value, and for writing the result value into the selectable register of the third digital processor circuit; and a digital majority voter circuit having a first input, a second input, and a third input, wherein the first input is coupled to receive a register value stored in the processor output register of the first digital processor circuit, wherein the second input is coupled to receive a register value stored in the processor output register of the second digital processor circuit, and wherein the third input is coupled to receive a register value stored in the processor output register of the third digital processor circuit, wherein the means for executing of the first digital processor circuit receives one of the two other register values from the second processor circuit and receives the other of the two other register values from the third processor circuit, wherein the means for executing of the second digital processor circuit receives one of the two other register values from the first processor circuit and receives the other of the two other register values from the third processor circuit, and wherein the means for executing of the third digital processor circuit receives one of the two other register values from the first processor circuit and receives the other of the two other register values from the second processor circuit.

23. The integrated circuit of claim 22, wherein the first input of the digital majority voter circuit is a first single-bit digital input lead, wherein the second input of the digital majority voter circuit is a second single-bit digital input lead, and wherein the third input of the digital majority voter circuit is a third single-bit digital input lead.

24. The integrated circuit of claim 22, wherein the means for executing of the first digital processor circuit comprises a plurality of input multiplexers, an arithmetic logic unit (ALU), a resolver logic unit (RLU), and instruction decode and control logic.

* * * * *